United States Patent
Shintani

(10) Patent No.: US 8,054,737 B2
(45) Date of Patent: Nov. 8, 2011

(54) INFORMATION STORAGE APPARATUS AND INFORMATION RECORDING METHOD IN WHICH RECORDING IS CARRIED OUT BY PROPAGATING PLASMONS ALONG A NETWORK OF METAL RODS PROVIDED IN A RECORDING MEDIUM

(75) Inventor: Toshimichi Shintani, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 273 days.

(21) Appl. No.: 12/474,660

(22) Filed: May 29, 2009

(65) Prior Publication Data

US 2009/0303861 A1 Dec. 10, 2009

(30) Foreign Application Priority Data

Jun. 4, 2008 (JP) ................................ 2008-146818

(51) Int. Cl.
*G11B 9/12* (2006.01)
*G11B 7/24* (2006.01)
*G11B 7/0065* (2006.01)

(52) U.S. Cl. ................... 369/126; 369/44.38; 369/272.1

(58) Field of Classification Search .................. 369/126, 369/272.1, 276; 365/106, 215, 234; *G11B 9/12*
See application file for complete search history.

(56) References Cited

U.S. PATENT DOCUMENTS

| | | | | |
|---|---|---|---|---|
| 4,884,243 A | * | 11/1989 | Johnston et al. | 365/234 |
| 5,761,181 A | * | 6/1998 | Nunnally | 369/126 |
| 2004/0120246 A1 | * | 6/2004 | Park et al. | 369/126 |
| 2005/0052983 A1 | * | 3/2005 | Vincent et al. | 369/126 |
| 2007/0153602 A1 | | 7/2007 | Kang | |
| 2007/0230233 A1 | * | 10/2007 | Takahashi et al. | 365/145 |

FOREIGN PATENT DOCUMENTS

JP 2007-184084 A 7/2007

OTHER PUBLICATIONS

M. Todorovic et al., Writing and reading of single magnetic domain per bit perpendicular patterned media, Applied Physics Letters, vol. 74, No. 17, Apr. 26, 1999, pp. 2516-2518.
R. Rottmayer et al., Heat-Assisted Magnetic Recording, IEEE Transactions on Magnetics, vol. 42, No. 10, Oct. 2006, pp. 2417-2421.
K. Anderson et al., Polytopic multiplexing, Optics Letters, vol. 29, No. 12, Jun. 15, 2004, pp. 1402-1404.

* cited by examiner

*Primary Examiner* — Peter Vincent Agustin
*Assistant Examiner* — Mark Fischer
(74) *Attorney, Agent, or Firm* — Mattingly & Malur, PC

(57) ABSTRACT

Provided is a medium capable of implementing a large-capacity recording at low cost per bit. A medium including a network of metal wires and recording materials each provided at an intersection of the metal wires. Surface plasmons are made to propagate along the metal wires. Two surface plasmons are made to propagate in two different directions and to collide with each other at a certain position. Multiple-layer recording is carried out by changing the recording materials at the certain position.

10 Claims, 9 Drawing Sheets

FIG. 3A
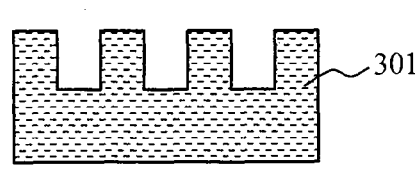
FIG. 3B
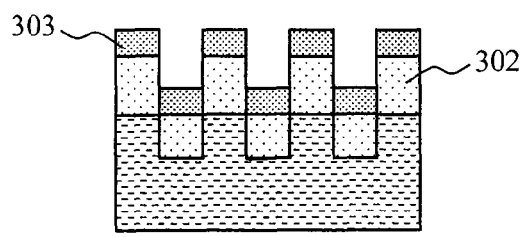
FIG. 3C
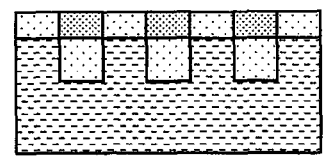
FIG. 3D
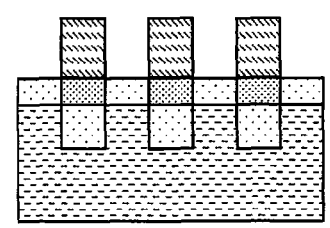
FIG. 3E
FIG. 3F
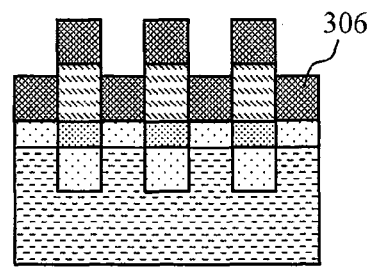
FIG. 3G
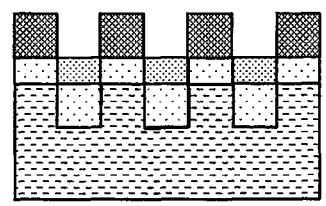
FIG. 3H
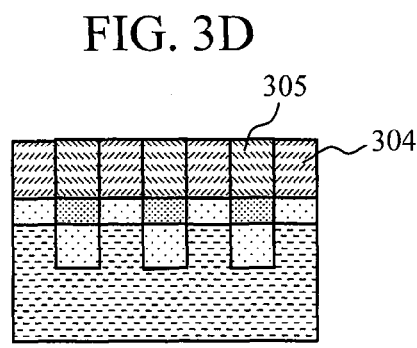
FIG. 3I
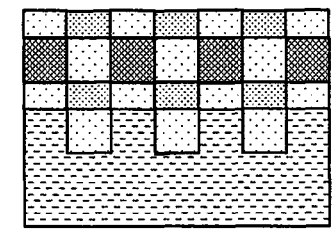

INFORMATION STORAGE APPARATUS AND INFORMATION RECORDING METHOD IN WHICH RECORDING IS CARRIED OUT BY PROPAGATING PLASMONS ALONG A NETWORK OF METAL RODS PROVIDED IN A RECORDING MEDIUM

BACKGROUND OF THE INVENTION

1. Field of the Invention

The present invention relates to a large-capacity storage medium and its recording and readout method.

2. Background Art

An increased amount of digital information has been handled year after year all over the world, resulting in a demand for digital storage devices with a larger recording capacity. Semiconductor memories such as flash memories, hard disk drives (HDDs), and optical recording media have been improved in their respective recording densities, resulting in lowering of the cost per bit. The future growth of the amount of digital information to be handled all over the world is expected to be explosive, thus requiring the development of storage devices that have still larger capacities.

The progress in microfabrication techniques allows the semiconductor memories to have smaller-sized memory cells of higher integration, so that both the recording density and the recording capacity of semiconductor memories are increasing. The size of each memory cell depends on the minimum size in fabrication. The fabrication technique of today can handle wires of 45-nm width each, but it is expected that wires of 32-nm width each and of approximately 22-nm width each will be handled in the future. In addition, not only the microfabrication techniques but also multilayer cells have been proposed as an idea of allowing the semiconductor memories to have larger capacities. An example of such proposal is disclosed in Japanese Patent Application Publication No. 2007-184084. The research and development thereof are progressing day by day.

The improvement of the recording density for HDDs has been achieved by making the size of each recording mark smaller. To record the smaller marks accurately, improvements have been achieved in the technique to localize a recording magnetic field produced by a recording head, as well as in the technique related to recording media to reduce variations in the mark shape. In addition, miniaturization of a readout magnetic field due to the smaller recording marks has been dealt with both by shortening the head-medium distance and by improving the sensitivity of the magnetic-field sensor. Moreover, as techniques to achieve a recording density of 1 Tb/in$^2$ or higher, Applied Physics Letters, Vol. 74, pp. 2516-2518 discloses a technique known as "patterned media" in which patterns are formed on the medium in advance. Additionally, another technique proposed, for example, in IEEE Transaction on Magnetics, Vol. 42, pp. 2417-2421, is known as "heat-assisted magnetic recording" in which the medium is locally heated at the time of recording data thereon.

In the field of the optical recording, larger recording capacities have been accomplished by: the improvement in recording density, which is accomplished by using a light source of a shorter wavelength and by improving the numerical aperture of the objective lens; and the development of dual-layer recording media. Further development of multilayer media or of multiplexing techniques, and further improvement in recording density are expected to bring about the development of larger-capacity media. In addition, various ideas of the techniques, including the technique of further improving the recording density, the technique related to multilayer recording media, and the multiplexing technique such as the hologram, to give a CD-size disk of a 120-mm diameter a recording capacity of approximately 500 GB to 1 TB have been proposed, for example, in Optics Letters, Vol. 29, pp. 1402-1404. Particularly, the holographic recording, which is a method of accomplishing the larger-capacity data recording by means of the diffraction of light, is a promising method of accomplishing higher-speed data transfer because the recording data are acquired by using the diffraction images of plural pieces of data, that is, by using what is known as "parallel data processing."

[Patent Document 1] Japanese Patent Application Publication No. 2007-184084

[Non-Patent Document 1] Applied Physics Letters, Vol. 74, pp. 2516-2518

[Non-Patent Document 2] IEEE Transaction on Magnetics, Vol. 42, pp. 2417-2421

[Non-Patent Document 3] Optics Letters, Vol. 29, pp. 1402-1404

SUMMARY OF THE INVENTION

The above-mentioned techniques have the following problems. The semiconductor memory has a complex structure; thus the manufacture of semiconductor memories having a multilayer structure requires more man-hours and higher manufacturing cost. As for a reduction in the minimum pattern width, no technique has been proposed to form patterns each having a width of 22 nm or narrower with high throughput. For this reason, miniaturization of cell size has its own limits.

The HDDs, which have been achieving larger recording capacities by the improvement in recording density, have difficulties in accomplishing a recording density that is as high, for example, as 10 Tbit/in$^2$. Such a high recording density needs the minimum bit size of 8 nm or smaller in diameter, which is equal to or smaller than the size of each crystal grain of the recording film. It is extremely difficult to record magnetic domains of such a small size in well-defined shapes, and it is also extremely difficult to keep the small magnetic domains in a stable state. In addition, the current HDDs need the head to be brought close to the medium when the marks are recorded or read out. Accordingly, it is impossible, in principle, to accomplish the multilayer recording with the HDDs.

The technique of hologram in the field of the optical recording uses the diffraction images of plural data to record or read out, and is therefore very sensitive to such factors as fluctuation of the wavelength of the light source and fluctuation of the optical wavefront. Correcting the fluctuation needs a number of extra optical parts, which poses the problem of cost reduction.

As described above, the techniques proposed so far have the problem of cost, or the technical problem of achieving even larger recording capacities.

An information recording medium provided by an aspect of the present invention comprises a structure in which a plurality of wire layers are stacked one upon another with a dielectric layer interposed between each adjacent two of the wire layers, each of the wire layers being formed of a plurality of metal wires arranged in a two-dimensional lattice shape in dielectrics except for lattice points, and recording materials each arranged at a corresponding one of the lattice points, wherein the recording materials are provided discretely at the plurality of lattice points that are distributed three-dimensionally. The recording material is a material in which each of the recording materials brings about any one of a chemical change and a physical change by absorption of energy. For example, a phase-change material or azoic dye is used as the recording materials.

An information storage apparatus provided by another aspect of the present invention comprises an information recording medium having a structure in which a plurality of wire layers are stacked one upon another with a dielectric layer interposed between each adjacent two of the wire layers, each of the wire layers being formed of a plurality of metal wires arranged in a two-dimensional lattice shape in dielectrics except for lattice points, and recording materials each arranged at a corresponding one of the lattice points, the recording materials being provided discretely at the plurality of lattice points that are distributed three-dimensionally. The information storage apparatus also comprises first and second optical systems. The first optical system is positioned so as to face a first surface of the information recording medium and which irradiates light selectively onto an end face of one of the plurality of metal wires exposed on the first surface in a two-dimensional array shape. The second optical system is positioned so as to face a second surface of the information recording medium. The second surface includes exposed end faces of metal wires arranged in the direction crossing the metal wires exposed on the first surface and arranged within the same wire layer that the metal wires exposed on the first surface belong to, the second optical system irradiating light selectively onto an end face of one of the plurality of metal wires exposed on the second surface in a two-dimensional array shape. In addition, the information storage apparatus comprises a control unit to control the positions of the first and second optical systems. The control of the positions of the first and second optical systems causes interference, at the position of the recording material provided at a corresponding desired one of the lattice points, between a surface plasmon that is excited, by the irradiation of light from the first optical system, on the metal wire with its end face exposed on the first surface of the information recording medium and a surface plasmon that is excited, by the irradiation of light from the second optical system, on the metal wire with its end face exposed on the second surface of the information recording medium.

It is preferable that: at least one of the first and second optical systems should include an objective lens and a probe that generates near-field light; the objective lens should concentrate incident light on the probe; and the near-field light generated by the probe should be irradiated onto the end face of the metal wire.

The information recording medium may have any one of a cube shape and a cuboid shape. Alternatively, the information recording medium may have a disk shape. The information storage apparatus that uses a disk-shaped medium further comprises a medium driving unit that drives to rotate the disk. In addition, the first optical system faces any one of a top surface and a bottom surface of the disk-shaped information recording medium, whereas the second optical system faces a side surface of the disk-shaped information recording medium. In the case of using the disk-shaped medium, the wire layers are arranged perpendicularly to disk surfaces of the disk-shaped information recording medium.

When data are read out, beams of light are emitted simultaneously from the first and second optical systems onto their respective end faces of the metal wires so as to make the surface plasmons interfere with each other at the position of the recording material provided at the corresponding desired one of the lattice points. The scattering of the surface plasmons that interfere with each other causes scattered light, which is detected to read out the data.

An information recording method provided by still another aspect of the present invention is a method of recording information in an information recording medium. The information recording medium includes: a plurality of first metal wires extending in a predetermined direction to be arranged in a two-dimensional lattice shape among dielectrics except for lattice points; a plurality of second metal wires extending in a direction that crosses the above-mentioned predetermined direction; and recording materials each arranged at a corresponding one of the lattice points. The information recording method comprises the steps of: selecting one of the plurality of first wires; selecting one of the plurality of second wires; and recording data by irradiating beams of light onto an end face of the selected first wire and onto an end face of the selected second wire, and thus by changing the recording material at an intersection between the selected first wire and selected second wire. It is preferable that the irradiation of the beams of light should be carried out by use of beams of near-field light.

According to the present invention, three-dimensional near-field recording is achieved by: fabricating a medium including metal wires that are arranged three-dimensionally and the recording materials each provided at the intersection of the metal wires; and by making surface plasmons propagate along the surfaces of the metal wires. The medium of the present invention has a simple structure and can be manufactured at low cost. In addition, the medium of the present invention can accomplish larger-capacity recording with lower cost per bit.

BRIEF DESCRIPTION OF THE DRAWINGS

FIGS. 3A to 3I are diagrams illustrating fabrication processes of the recording medium of the present invention.

DETAILED DESCRIPTION OF THE PREFERRED EMBODIMENTS

The present invention solves the above-described problems by accomplishing multilayer recording using surface plasmons, which are electric-charge compressional waves that propagate on the interface between a metal and a dielectric.

When beams of light enter a metal, the free electrons in the metal usually move in a direction so as to block the oscillatory electric field of the light. Thus, the light reflects off the surface of the metal. If, however, the incident light has a wave-number vector that is parallel with the interface between the metal and the dielectrics, free electrons located near the surface of the metal form electric-charge compressional waves in that direction. The electric-charge compressional waves propagate along the metal-dielectrics interface. These electric-charge compressional waves are known as "surface plasmon." It is certain that part of the energy that the surface plasmons have is lost by, for example, being converted to Joule heat, but, according to the description by Science 311, pp. 189-193 (2006), the surface plasmons can propagate by a 10-mm distance or farther than that. The present invention uses such properties of surface plasmons to propagate the surface plasmons in a medium that includes a metal wire, and thereby to accomplish high-density, multilayer recording.

Figure 1:
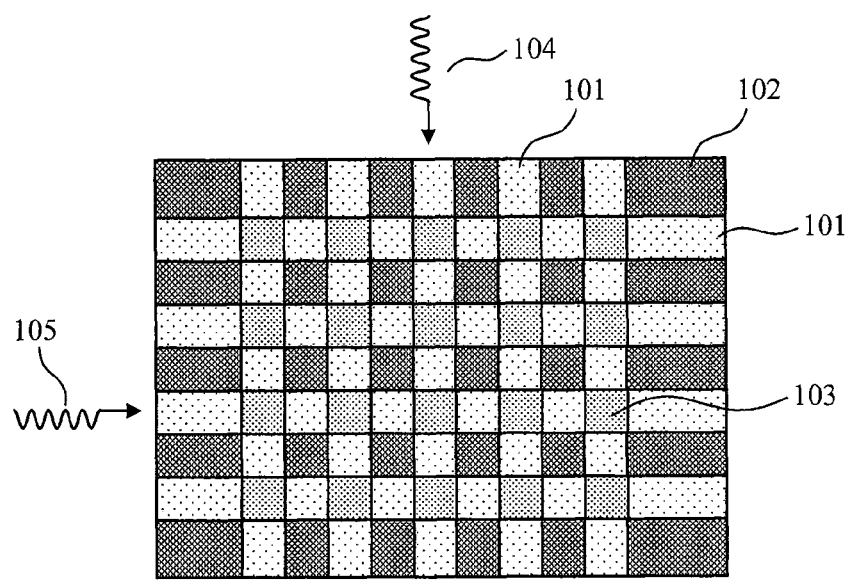
FIG. 1 is a diagram illustrating the structure of a recording medium of the present invention.

FIG. 1 is a diagram illustrating the concept. The medium includes: metal wires 101 that are arranged two-dimensionally; and dielectrics 102 that fill the areas surrounding the metal wires 101. Recording materials 103 are each provided at an intersection of the metal wires 101. As FIG. 1 shows, the plural metal wires are arranged in a two-dimensional lattice shape among the dielectrics except for lattice points, whereas the recording materials are arranged at the lattice points. A layer thus constructed is referred to as a wire layer. Beams of light 104 and 105 enter the metal wires of this wire layer in two different directions. These beams of incident light 104 and 105 excite surface plasmons on the metal wires, and the surface plasmons thus excited propagate on the metal wires. The two surface plasmons propagating in the two different directions are passing through the plural intersections, that is, the plural recording materials. Here, the two surface plasmons interfere with each other at an intersection of the wires. The interference is used for recording and reading-out of the data.

The recording materials 103 absorb the surface plasmon propagating therethrough. All the recording materials located at the points that the surface plasmons pass through absorb energy. Note that a larger amount of electromagnetic energy is radiated from the intersection of the two surface plasmons. Accordingly, the amount of energy absorbed by the recording material located at the intersection of the two surface plasmons is larger than the energy absorbed by the other recording materials. As the recording material that absorbs energy sometimes changes its chemical or physical properties, it is possible to set the energy levels of the beams of incident light 104 and 105 so that such chemical or physical change will occur only in the recording material located at the position where the two surface plasmons interfere with each other. The energy levels set in this way can cause a change in only the recording material located at the intersection of the two surface plasmons. What is made possible accordingly is the selection of the portion where the data are to be actually recorded.

The reading-out of the recorded data also uses the interference of two surface plasmons as in the above-described case of the data recording. All the recording materials that a surface plasmon passes through absorb the electromagnetic energy of the surface plasmon, but scatter part of the energy that the surface plasmon has. The light thus scattered is converted from near-field light to far-field light that will propagate. The far-field light goes out of the medium and reaches a photo detector. The intensity of this propagating light is determined by optical properties, such as the refractive index, of the recording material. This means that the intensity of the propagating light depends on the recorded/not-recorded state of the recording material. Accordingly, detecting the intensity of the scattered light from a particular recording material will tell whether or not data are recorded in the recording material in question.

According to the present invention, since each surface plasmon passes through plural recording materials, the intensities of the scattered light reflect the states of all the points that the surface plasmon pass through. This problem is solved by making light enter the medium in at least two different directions. When beams of light are made to enter the medium in two different directions and two surface plasmons are made to propagate, the two surface plasmons interfere with each other at the intersection thereof. The recording materials provided at the intersections of the wires scatter light and the scattered light is emitted out of the medium. The energy of this light becomes larger when the interference between the two surface plasmons occurs at the intersection thereof. Accordingly, when the intensity of the scattered light is detected, the signal from the intersection between the two surface plasmons reflects the strongest intensity of light. Observing the intensity of the signals will give information on whether or not the data are recorded at particular intersections of the wires.

Figure 4:
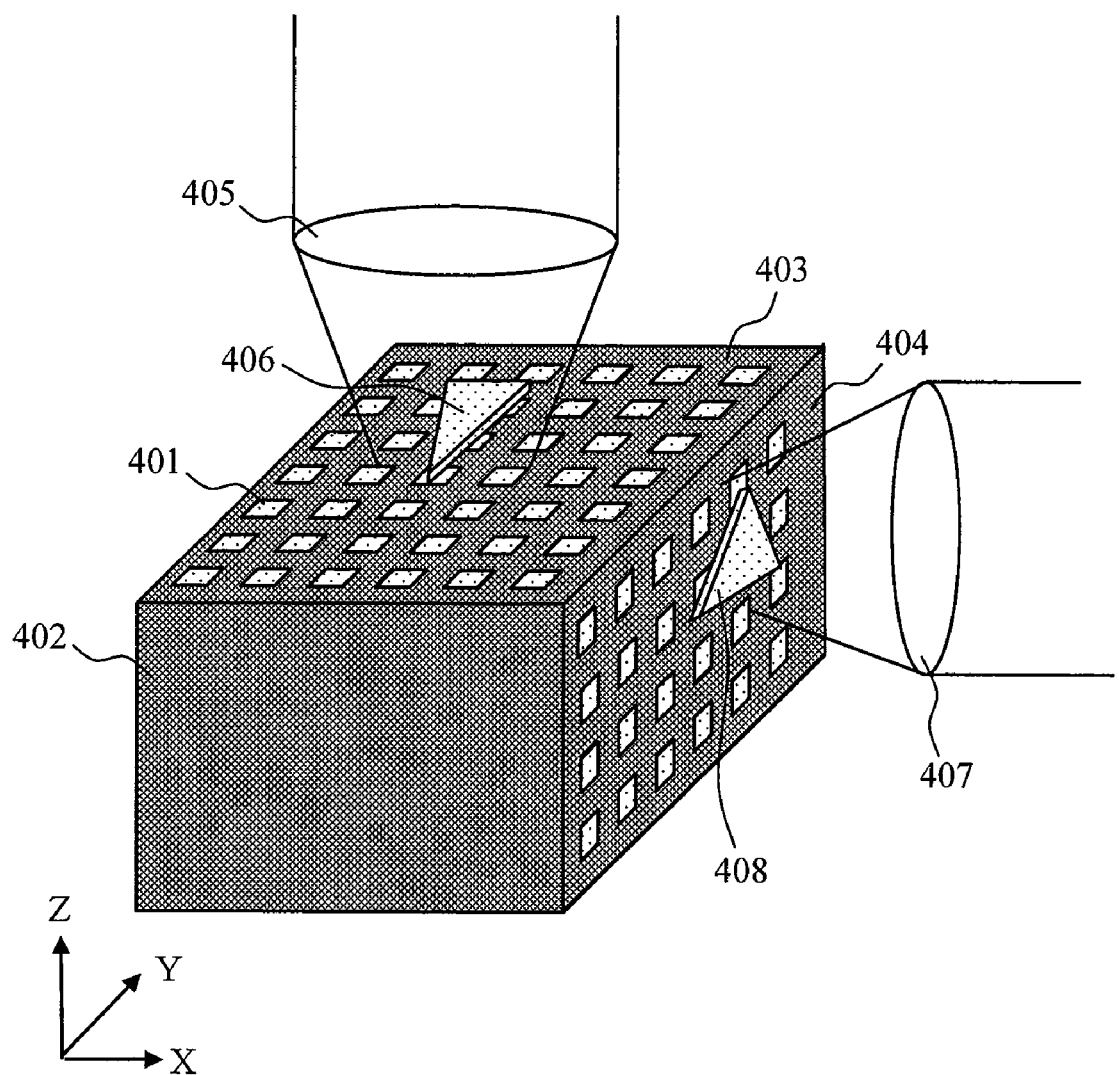
FIG. 4 is a schematic diagram illustrating an exemplar relationship among the medium, probes, and beams of incident light of the present invention.
Figure 10:
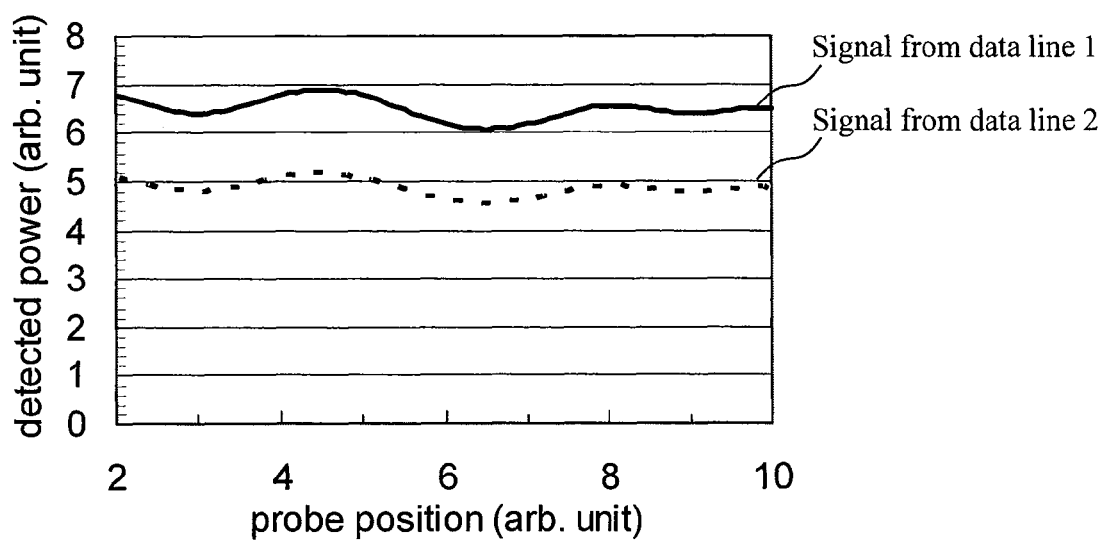
FIG. 10 is a chart illustrating part of readout signals obtained according to the present invention.

FIG. 10 shows exemplar readout signals. FIG. 10 plots the amount of the scattered light detected in a case where one (hereafter, referred to as a "probe A") of the two probes shown in FIG. 4 is fixed to a position and the other one (hereafter, referred to as a "probe B") is used for scanning the surface of the media. To this end, the horizontal axis of the graph shown in FIG. 10 represents the position of the probe B. The positions on the horizontal axis correspond respectively to the intersections of the wires. Accordingly, each of the points that the data are marked at in the graph has a horizontal-axis coordinate with an integer number. FIG. 10 shows two lines of signals, which are referred to as a data line 1 and a data line 2, respectively, and the difference between the two data lines 1 and 2 lies in the position of the probe A. Among the pieces of data in the data line 1, a difference in the signal level can be observed, for example, between the piece of data at the probe position 3 and that at the probe position 6. The difference derives from the fact that the piece of data at the probe position 3 represents a signal from the recording material with no data recorded thereon, whereas the piece of data at the probe position 6 represents the signal from the recording material with data recorded thereon. Detecting the signal-level difference between two probe positions makes it possible to detect whether or not data are recorded at a particular intersection of the wires. Note that the signal includes a DC component because the signal level at each probe position is inevitably affected by the scattered light that is emitted when the surface plasmon passes through the other intersections of the wires. The above-mentioned scattered light is emitted by a certain constant amount for a given data line, so that the DC components can be removed from the photodetector signal by means of a high-frequency pass filter. Note that the magnitude of the DC component included in the readout signal for the data line 1 differs from that for the data line 2. This is because the data that are recorded in the data line 1 differ from those recorded in data line 2. The difference in the recorded data causes the difference between the total amounts of scattered light emitted from the respective data lines 1 and 2. Nevertheless, the signal from the data line 2 shows that the signal level at the probe position 3 differs from the signal level at the probe position 6, so that reading-out of the recorded data is possible through the detection of this difference in the signal level.

Materials that may be used as the recording material should be the ones that react with light and/or heat. For example, the recording materials used in optical disks may be used to this end. Some specific examples of the recording materials are:

the azoic dye used in CD-Rs and DVD-Rs; and a phase-change recording film, which uses the change between the crystalline phase and the amorphous phase for the recording of data. In the case of the azoic dye used in CD-Rs, the heat generated by the irradiation of light at the time of recording data destroys the molecules of the azoic dye. Such destruction brings about a difference in optical properties between the azoic dye located at a position where data are recorded and the azoic dye located at a position where no data are recorded. The above-mentioned difference in optical property causes a difference in the amount of scattered light, and the difference in the amount of scattered light allows the detection, by use of a photo detector, as to whether or not data are recorded at a particular position. This change, i.e., the destruction of molecules, is irreversible, so that rewriting data is impossible. In the case of the phase-change recording film, the refractive index of the material in the amorphous phase differs from the refractive index of the same material in the crystalline phase, so that whether the material is in the amorphous phase or in the crystalline phase brings about a difference in the amount of scattered light. Accordingly, the contents of the recorded data can be detected by means of a photo detector. The phase change between the amorphous phase and the crystalline phase is reversible, so that rewriting data is possible.

A possible way of making the beams of incident light 104 and 105 enter the medium is irradiating each of the beams of light 104 and 105 onto the corresponding one of the metal wires by use of an objective lens. Note that, to accomplish high-density recording, it is necessary to narrow the distance between every two adjacent metal wires. The use of an objective lens for the entry of the light renders the light spot to have a size of $\lambda/NA$ where $\lambda$ represents the wavelength of the light source and NA represents the numerical aperture of the objective lens. Accordingly, if the above-mentioned distance between the metal wires is equal to or narrower than $\lambda/NA$, the light enters plural metal wires. Since the intensity distribution of the light spot is a Gaussian distribution, or a distribution close to a Gaussian distribution, the strongest surface plasmon is excited on the metal wire that is radiated with the center of the light spot—the portion with the highest intensity. This is a similar phenomenon as the one observable in the case of an ordinary optical disk.

If the distance between every two adjacent metal wires is as narrow as or narrower than the $\lambda/4NA$, the diffraction limit of the light almost equalize the energies of the surface plasmons exited on their respective ones of the plural metal wires. This problem can be solved by the entry of each of the beams of incident light 104 and 105 in the form of near-field light. Specifically, a mechanism is provided to scan each of the two surfaces of the recording medium with a near-field head. A beam of light is made to enter the near-field head to generate near-field light in the head. The near-field light is used for exciting a surface plasmon on a particular metal wire. In this way, a surface plasmon can be excited only on a single metal wire. Various near-field heads have been proposed thus far. For example, a structure described in Journal of Applied Physics, Vol. 95, pp. 3901-3906 (2004) may be used to this end. Normally, the near field light interacts only with the surface of the sample, but combining the surface-plasmon propagation structure shown in FIG. 1 with two near-field heads can implement the multilayer recording.

Figure 2:
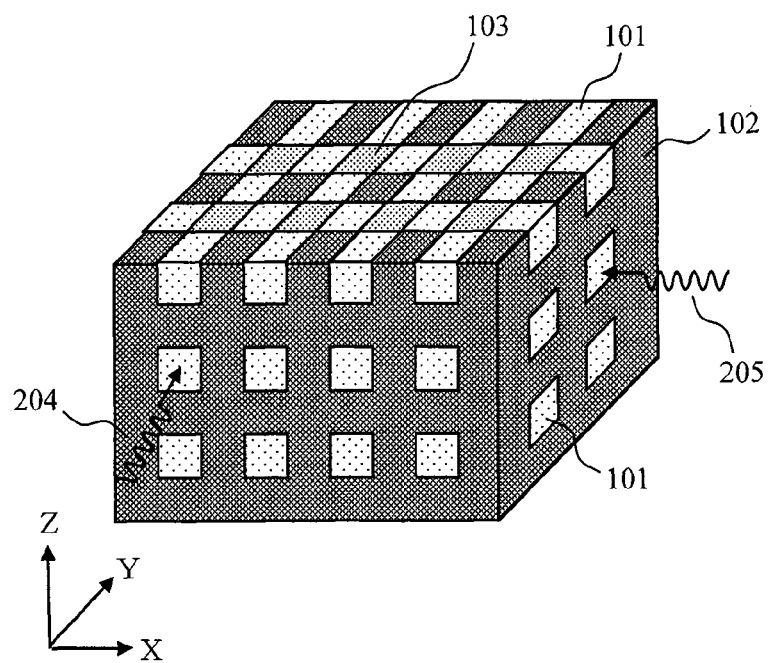
FIG. 2 is a diagram illustrating the structure of a three-dimensional recording medium of the present invention.

FIG. 1 illustrates a single wire layer in which metal wires are arranged two-dimensionally. If plural wire layers are stacked one upon another with a dielectric layer interposed therebetween as shown in FIG. 2, three-dimensional recording can be implemented. In the example shown in FIG. 2, each wire layer is arranged in parallel with the XY-plane, and plural wire layer thus arranged are stacked one upon another in the Z-axis direction. As in the case of FIG. 1, the intersection where the data are actually to be recorded or the read out can be selected by making beams of light 204 and 205 enter in a manner illustrated in FIG. 2. Note that the beams of incident light 204 and 205 need to enter respectively the wires that belongs to the same wire layer. This is equivalent to selecting the layer where data are to be recorded or read out when the multilayer recording is carried out.

Air may be used as the dielectrics 102. A semiconductor material may be used for the purpose if it is appropriate. In addition, the metal wire 101 may be formed with metal particles arranged at a certain pitch. If a surface plasmon is excited on one of the metal particles that are arranged at a pitch ranging from several nanometers to several tens of nanometers, the surface plasmon creates a near field on the surface of the metal particle and in turn excites a surface plasmon on the adjacent metal particle. The phenomenon that occurs in a chain-reaction manner from one metal particle to another allows the surface plasmon to propagate along the array of the metal particles. This way of propagation of surface plasmon is described in, for example, Science 311, pp. 189-193 (2006).

A recording card may be fabricated by use of a medium shown either in FIG. 1 or in FIG. 2. The card drive apparatus includes either a head, or a near-field head, including an objective lens. Upon inserting the card, the head is brought to a position near the card to generate a surface plasmon, and then the surface plasmon thus generated is allowed to propagate.

The structure shown in either FIG. 1 or FIG. 2 may be adapted to a form of a disk. One of the two beams incident light is made to enter a rotating medium from a head that keeps a constant distance from the surface of the disk by use of a slider or the like as in the case of the heads in HDDs. The other one of the two beams of incident light is made to enter the medium from a head that is provided, for example, at a position facing the side surface of the disk. If the head provided so as to face the side surface of the disk is a near-field head, the distance from the side surface of the disk and the head has to be kept constant. Keeping the distance between the head and the side surface of the disk can be achieved by the pressure of the air flowing through the interstice between the side surface of the disk and the head, as in the case of the heads of ordinary HDDs.

The media shown in FIGS. 1 and 2 may be formed by a method combining the lithography using either light or electron beams with polishing. Firstly, a pattern including lines and spaces is formed in a substrate by the lithography. The portions where metal wires are to be disposed are formed to be line portions. Then, a metal film is formed on top of the resultant substrate by sputtering, deposition, or the like method. After that, the film surface in this state is polished to remove the metal formed on top of the space portions. The metal is thus left only on top of the line portions of the pattern, and the metal thus left will serve as the metal wires.

What follows is an exemplar method of burying the recording materials in the medium only at positions corresponding to the intersections of the metal wires thus formed in the above-described way. When the pattern is formed by lithography, the portions corresponding to the wires are formed as line portions, but the portions corresponding to the intersections of the wires are formed as space portions. After the metal wires are formed in the above-described way, the portions corresponding to the intersections of the wires are line portions by another round of lithography, and then a film of the recording material is formed on top of the resultant surface of the substrate. The surface of the sample in this state is then polished, and thus the recording materials are buried only in the portions corresponding to the intersections of the wires.

FIGS. 3A to 3I illustrate processes of an exemplar method of fabricating a multilayer medium. In the multilayer medium thus fabricated, a first dimension of the metal wires arranged two-dimensionally corresponds to a perpendicular direction to the medium. Firstly, a grooved pattern such as one shown in FIG. 3A is formed in a substrate 301. The grooves are formed in a two dimensional lattice shape. This pattern may be formed by lithography using light or electron beams. Alternatively, the pattern may be used either by imprinting using a stamper fabricated by lithography or by injection. A film of a metal 302 is formed on top of the substrate, and then a film of a recording material 303 is formed on top of the film of the metal 302, as shown in FIG. 3B. Then the resultant substrate is polished as shown in FIG. 3C. In this state, the metal 302 and the recording material 303 are buried only in the grooves formed two-dimensionally. Then, two different kinds of molecules 304 and 35 are arranged on top of the surface. The substance of the first molecules 304 and the substance of the second molecules 305 are selected so as to have a small interfacial energy between the first molecules 304 and the recording material 303 and so as to have a small interfacial energy between the second molecule 305 and both the surface of the substrate and the dielectrics. Such selection facilitates the bonding of the molecules 304 and 305 with their corresponding counterparts. Accordingly, as shown in FIG. 3D, the first molecules 304 are arranged on top of the recording materials 303, whereas the second molecules 305 are arranged on top of the surface of the substrate 301. Then the resultant substrate is subjected to a reactive ion etching process with the etching rate for the first molecules 305 being faster than that for the second molecule 304. Accordingly, only the second molecules 304 are left on the sample, as shown in FIG. 3E. Then, a film of dielectrics 306 is formed as illustrated in FIG. 3F. After that, the second molecules 305 are removed so that the resultant substrate will be in the state shown in FIG. 3G. Note that the film of the dielectrics is formed to cover all the portions except for the top of the recording material 303 that has been formed in the process described by referring to FIG. 3C. Then, another round of forming the films of the metal 302 and the recording material 303 is carried out to make the resultant substrate in the state shown in FIG. 3H. The resultant substrate is then polished in a similar way to the one described above, and thus the resultant substrate that has been polished becomes in the state shown in FIG. 3I. A multilayer medium is formed by repeating the above-described series of processes.

It is necessary for a storage device to identify the addresses for the pieces of data that are actually being recorded and read out. Various methods of address identification may be provided for the present invention. For example, in an exemplar method, pieces of data have been recorded at several recording points located in a predetermined pattern before the medium is made available for the user to record his/her own data. This method is the same as the one employed in HDDs. Specifically, every single sector is made to have a predetermined number of bits, and address data are recorded in the foremost one of the bits. Note that the present invention provides a three-dimensional recording method, and that the beams of light enter the medium from two different surfaces of the medium. Accordingly, addresses are defined for each of all the surfaces. For example, suppose that the address for every single surface is 16 bits and the address data are 32 bits. The 16 bits of the first half and the 16 bits of the second half may be used as the address data for each surface. In an alternative method, pieces of address data, each of which is 16 bits, may be alternately recorded. Such alternating recording enhances the possibility of restoring address data for each surface by means of an error-correction code, even when, for example, a minute defect in the medium makes the recording or reading-out of the address data impossible.

In still another method, patterns corresponding respectively to pieces of address data are formed in advance in the medium. For example, the wire patterns shown in FIG. 2 and in FIG. 4 are simple repetitive patterns. If, however, the patterns of the portions corresponding to the addresses are altered in a way or another, the patterns can be used as address data. For example, wire patterns of 32 bits, as in the case described above, corresponding to address data are formed cyclically among the repetitive patterns. Such wires can be formed by forming such patterns in the substrate 301 of FIG. 3. The interaction between the surface of the metal wire and the head makes it possible to detect light, so that these patterns can be read out by use of light.

The medium is made of a simple metal rod, and has a structure that is much simpler than the structure of a semiconductor element. Accordingly, the medium of the present invention can be manufactured at lower cost than the manufacturing cost of a semiconductor memory. In addition, providing multilayer HDDs that has been conventionally considered impossible can be accomplished by the present invention. Also, a reduction in the cost per bit can be accomplished.

Hereafter, descriptions will be given as to a first embodiment of the present invention, in which the present invention is applied to an information recording card. FIG. 4 illustrates schematically the concept of the card fabricated in this embodiment. The card has a structure in which gold rods 401 are buried in a resin 402, and azobenzene is provided at every intersection of two of the gold rods. The card is fabricated in the way that has been described above by referring to FIGS. 3A to 3I. Polystyrene and PMMA are used respectively as the substances of first and second molecules. Each gold rod has a 50-nm width, and the rods are arranged at a 100-nm pitch. The card has a cubic shape with 1-cm sides. In the example of FIG. 4, the wire layer shown in FIG. 1 is arranged so as to be parallel with the XZ-plane, and the plurality of such wire layers are stacked in the Y-axis direction.

Once the card is inserted into a card drive apparatus, heads of the card drive apparatus approach a surface A (denoted by 403) and a surface B (denoted by 404), respectively. The two head of the card drive apparatus includes a probe 406 and a probe 408 respectively. A beam of light enters the probe 406 through an objective lens 405, whereas another beam of light enters the probe 408 through an objective lens 407. Each of the probes 406 and 408 has a triangular shape having, for example, 150-nm sides. With this configuration, the oscillatory electric field that the incident light has collects the electrons oscillating in each probe at a vertex of the triangle, so that a strong near-field light is generated at the vertex. The near-field light generates surface plasmons on the gold rods 401. When a series of data are recorded on the recording materials disposed respectively at the lattice points, writing the data is carried out, for example, by fixing the probe 406 and the objective lens 405 that are positioned so as to face the surface 403 and by scanning the surface 404 with the objective lens 407 and the probe 408 which are positioned so as to face the surface 404 and which are being moved in the Z-axis direction. Alternatively, writing the data is carried out by fixing the objective lens 407 and the probe 408 which are positioned so as to face the surface 404 and by scanning the surface 403 with the objective lens 405 and the probe 406 which are positioned so as to face the surface 403 and which are being moved in the Z-axis direction. Still alternatively, writing the data is carried out by scanning the surface 403 with the objective lens 405 and the probe 406 which are positioned so as to face the surface 403 and which are being moved in the Y-axis direction and by scanning, in a synchronized manner, the surface 404 with the objective lens 407 and the probe 408 which are positioned so as to face the surface 404 and which are being moved in the Y-axis direction.

Figure 5A:
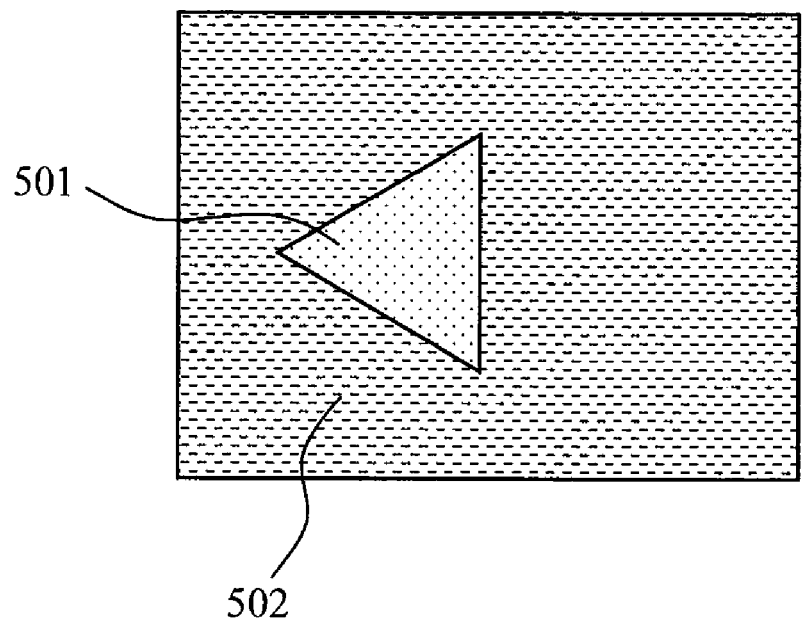
FIGS. 5A and 5B are diagrams each illustrating an example of the probes.
Figure 5B:
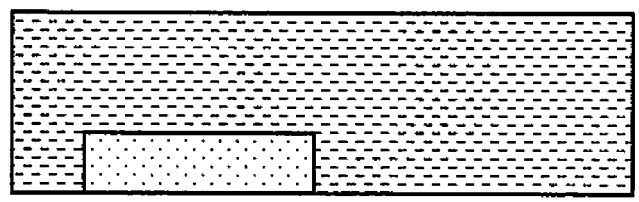

Each of the probes 406 and 408 is fabricated on an alumina substrate in the following way. A resin is applied on a surface of the alumina substrate, and then a stamper in which a raised, triangular-shaped pattern has been formed in advance is pressed against the resin-coated surface of the alumina substrate. A recessed, triangular-shaped pattern is formed in the resin. The resultant substrate is subjected to a reactive ion etching process to remove alumina, and thus a recessed, triangular pattern is formed on top of the alumina substrate. Subsequently, a film of gold is formed on the resultant pattern, and then the surface of the gold film is polished. Thus, gold is buried in the recessed, triangular pattern. Thus, a probe is completed. FIGS. 5A and 5B illustrate the probe thus formed. FIG. 5A is a plan view of the probe, whereas FIG. 5B is a sectional view thereof. In FIGS. 5A and 5B, reference numeral 501 denotes the probe and reference numeral 502 denotes the alumina.

Figure 6A:
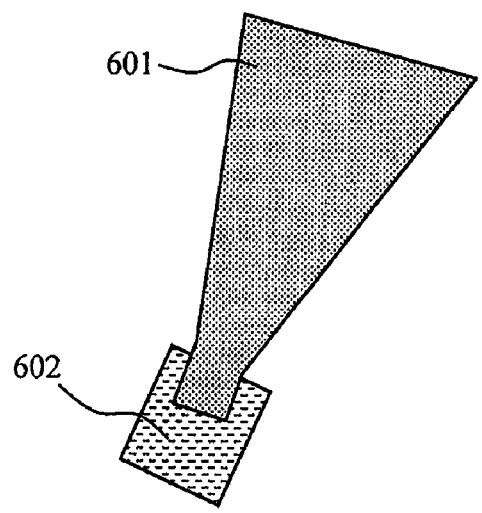
FIGS. 6A and 6B are diagrams each explaining a head including the probe and the vicinity of the head.
Figure 6B:
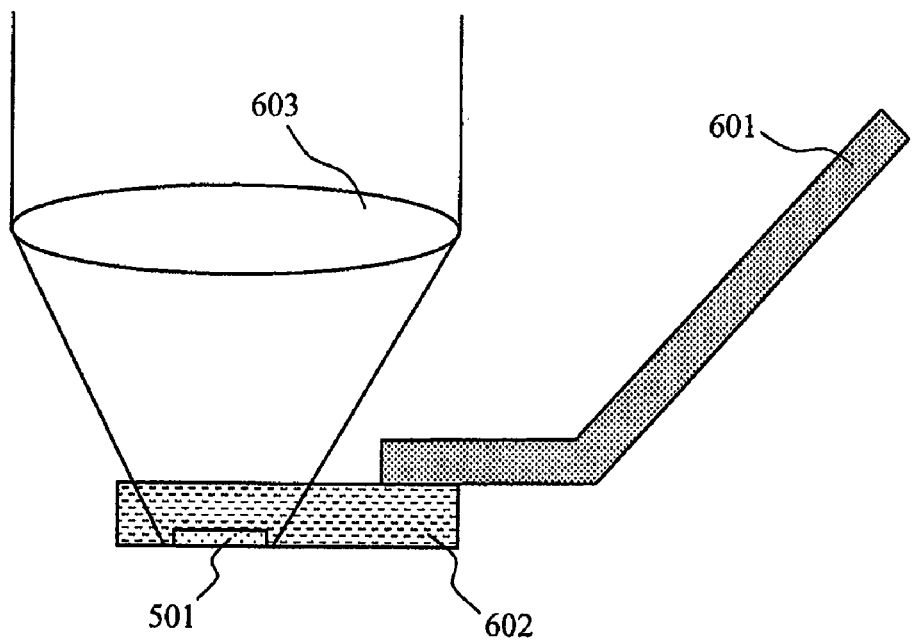

The probe thus fabricated is then assembled to a slider head 602 as illustrated in FIG. 6. Then, the slider head 602 is fitted to a gimbal 601. Light is introduced to the probe 501 by use of an objective lens 603 that concentrates the light on top of the probe 501.

Figure 7:
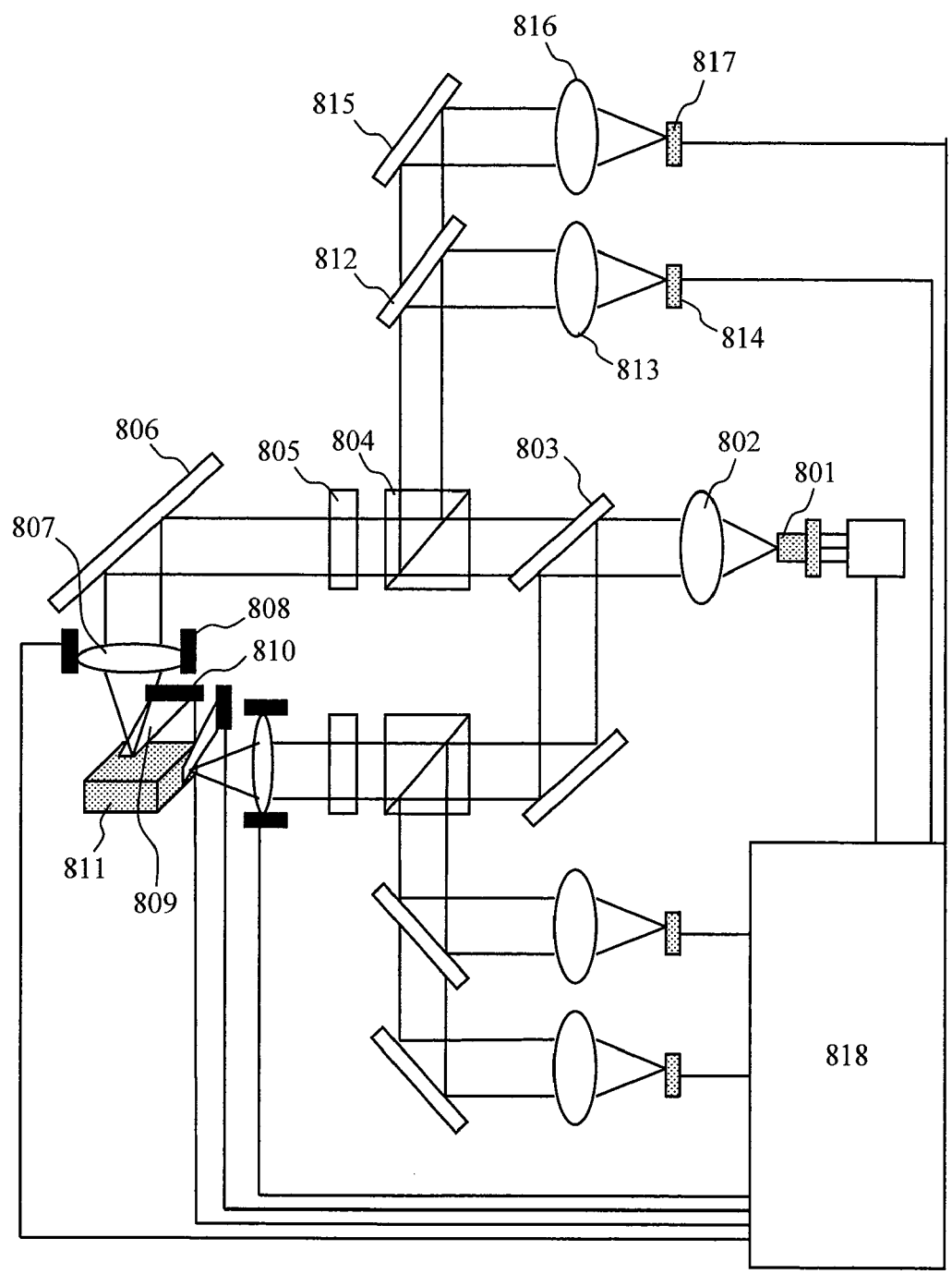
FIG. 7 is a diagram illustrating an exemplar configuration of a recording and reading-out apparatus for an information card to which the present invention is applied.

FIG. 7 shows an exemplar configuration of a card drive apparatus used for recording data on, and reading out data from, the information card illustrated in FIG. 4. A semiconductor laser 801 of a 780-nm wavelength emits linearly polarized light, which passes through an objective lens 802 and is split into two beams by a half mirror 803. One of the resultant two beams passes through a polarized beam splitter 804, and is transformed to circularly polarized light by a quarter-wave plate 805. Then, the beam of the circularly polarized light passes through a mirror 806 and then through an objective lens 807 before the beam enters the probe. Note that the objective lens is fitted to an actuator 808. The probe is fitted to the tip end of a gimbal 809 that is fitted to an actuator 810. The near-field light emitted from the probe generates a surface plasmon that propagates along one of the metal wire built in a recording card 811 from the upper side to the bottom side. In the meanwhile, the other one of the above-mentioned two beams formed by the split with the half mirror 803 passes through a similar optical system provided along the light path, and is eventually irradiated onto the other probe positioned so as to face a side surface of the recording card 811. Thus generated is a surface plasmon that propagates along one of the metal wires built in the recording card 811 from the right-hand side to the left-hand side.

If the center of each probe is offset from the center of the corresponding metal rod, scattered light is generated from the probe. The left-right asymmetry of the scattered light from the probe is used to adjust the relative positions of the metal rods and the probes, that is, to implement the tracking-servo function. The light scattered in a left-right asymmetrical manner of the head positioned above the information card 811 returns back to the objective lens 808 and is transformed to a linearly polarized light by the quarter-wave plate 805. The resultant linearly polarized light has a direction that differs from the linearly polarized light emitted from the semiconductor laser 801 by 90 degrees. Accordingly light path of the resultant linearly polarized light is bent by the polarized beam splitter 804 by 90 degrees, and then is made to enter photo detectors 814 and 817 by means of a half minor 812 and a minor 815. The photo detector 814 is provided to adjust the focusing of the objective lens 807, which is provided to concentrate the light on top of the probe. Note that astigmatic method is employed by the card drive apparatus. The photo detector 817 is a 2-division detector that can detect, individually, the intensity of light on the left-hand side and the intensity of light on the right-hand side. Accordingly, the asymmetry of the light scattered from the probe can be detected, and the positions of the probe and the corresponding one of the metal rods formed in the recording card 811 can be controlled so as to eliminate the difference between the light intensity on the left-hand side and the light intensity on the right-hand side. If the difference between the light intensity on the left-hand side and the light intensity on the right-hand side is finite, the signal is processed by a control system 818, and a signal is sent to the actuator 810 to correct the position of the probe. A feedback control is executed on the position of the probe so that the light intensities on the left-hand side and on the right-hand side can be equal to each other. Similar ways of controlling are provided both to control the position of the probe which is positioned so as to face the side surface of the information card 811 and which makes the surface plasmon propagate on the corresponding metal rod and to adjust the focusing of the objective lens used to irradiate the light onto this probe.

When data is recorded, light of higher intensity is emitted from the semiconductor laser 801. Accordingly, surface plasmons that are excited on the information card 811 in two different directions propagate on their corresponding metal rods, and interfere with each other at the intersection of their respective rods to create a strong electric field. The recording material (azobenzene) provided at this intersection absorbs this strong electric field. The absorption raises the temperature of the recording material, and thus causes a phase change from the amorphous phase to a crystalline phase. Digital data are recorded in this way. The azobenzene provided at the other intersections of the metal rods than the above-mentioned one where the surface plasmons propagating in the two directions collide with each other also absorbs the surface plasmon. The intensities of the electric field at these intersections are sufficiently lower than the threshold for triggering the phase change of the azobenzene. So no phase change of the azobenzene takes place at each of these intersections.

For the purpose of reading out the recorded data, the scattering of the surface plasmons are used. As in the case described above, a strong electric field is created at the intersection where the surface plasmons propagating in the two directions collide with each other. Accordingly, the scattered light from this intersection has a higher intensity, that is, the intensity of the scattered light reflects the state of the relevant intersection. The scattered light is picked up by the objective lens 807, and the intensity of the scattered light is detected as a sum of the signals detected by the 2-division photo detector 817. The signal thus detected is a mixture of the light scattered from the probe and the scattered light at the intersection of the two surface plasmons. Note that the light scattered from the probe is substantially constant, so that the always-constant scattered light from the probe remains in the summed signal as a DC component. This means that the scattered light from the probe has no disturbing influence on the data signal.

Data were recorded by use of incident light with a power equivalent to 30 mW at each of the probes 406 and 408 and with a pulse width of 3 ns. In addition, data were read out by use of incident light with a power of 1.5 mW. A bit-error rate of $1.5 \times 10^{-5}$ was obtained when data were read out after the recording of the data.

With the above-described configuration, recording and reading-out of digital data of 1.5 TB were accomplished using a card of a cubic shape with 1-cm sides.

Hereafter, descriptions will be given as to a second embodiment of the present invention, in which the present invention is applied to a disk medium. The disk has a 25-mm diameter and a 1-mm thickness. A hole of a 5-mm diameter is formed at the center of the disk, and is used when the disk is fitted to a hub of a rotation system. The medium of this embodiment has a basic structure that is substantially the same as the structure illustrated in FIG. 4. The surface 403 illustrated in FIG. 4 corresponds to an ordinary planar surface of the disk, whereas the surface 404 in FIG. 4 corresponds to the side surface of the disk. The recording material used in this embodiment is GeSbTe, which is known as a phase-change recording material. The wire layer illustrated in FIG. 1 is perpendicular to the disk surface of the disk-shaped information recording medium, and a multiplicity of the wire layers are stacked in the circumferential direction of the disk. The density of the gold rods within the surface 403 is similar to that in the first embodiment, that is, each rod has a 50-nm width in the track direction, and the rods are arranged at a pitch of 100 nm. In the surface 404, which corresponds to the thickness direction of the disk, each rod has a 500-nm width and the rods are arranged at a pitch of 5 µm. One hundred metal rods are provided in the perpendicular direction to the medium. This is equivalent to a three-dimensional recording with 100 layers. Each of recording materials provided at intersections of the rods has dimensions of 50 nm×50 nm×500 nm.

Figure 8A:
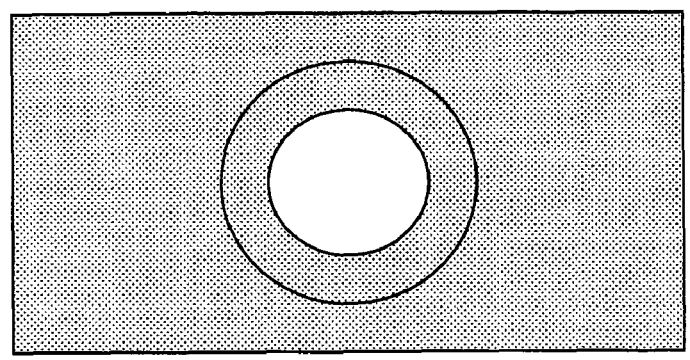
FIGS. 8A and 8B are diagrams each explaining a head including a probe and an objective lens as well as the vicinity of the head.
Figure 8B:
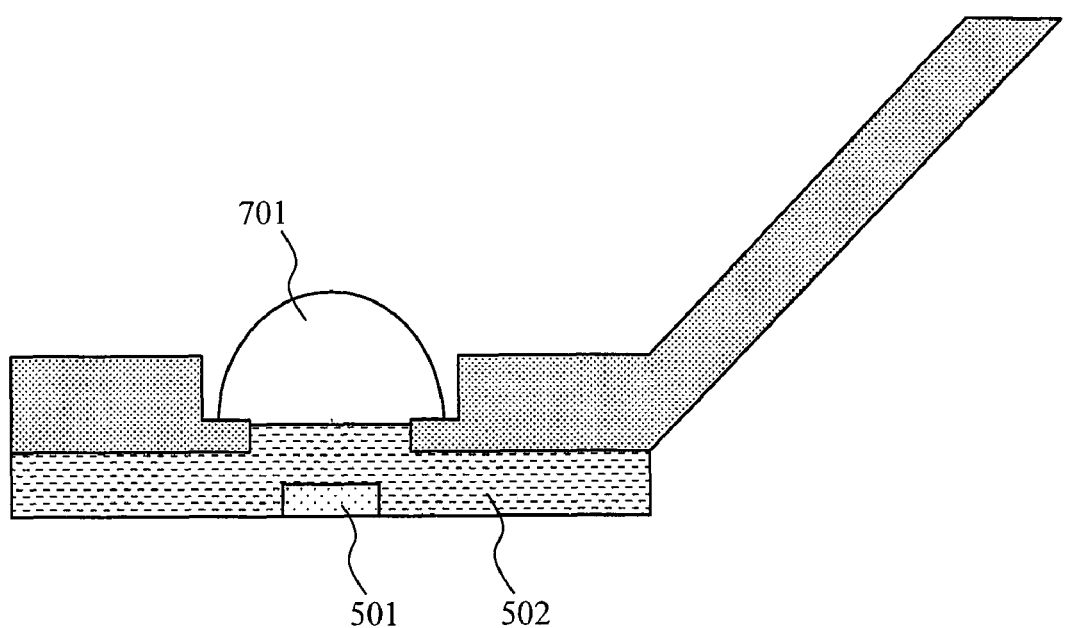

A head fabricated for this embodiment is illustrated in FIGS. 8A and 8B. As an objective lens, a solid immersion lens 701 is mounted on the head. Light is made to enter the disk from the top surface thereof by use of a probe as in the case of the first embodiment. No probe is used, however, for the entry of light from the side surface of the disk. An objective lens is used to focus the light on the side surface of the disk. The probe illustrated in FIGS. 8A and 8B is applicable to a case of the information card of the first embodiment. In addition, the probe illustrated in FIG. 6 can be used for the disk of this embodiment.

Figure 9:
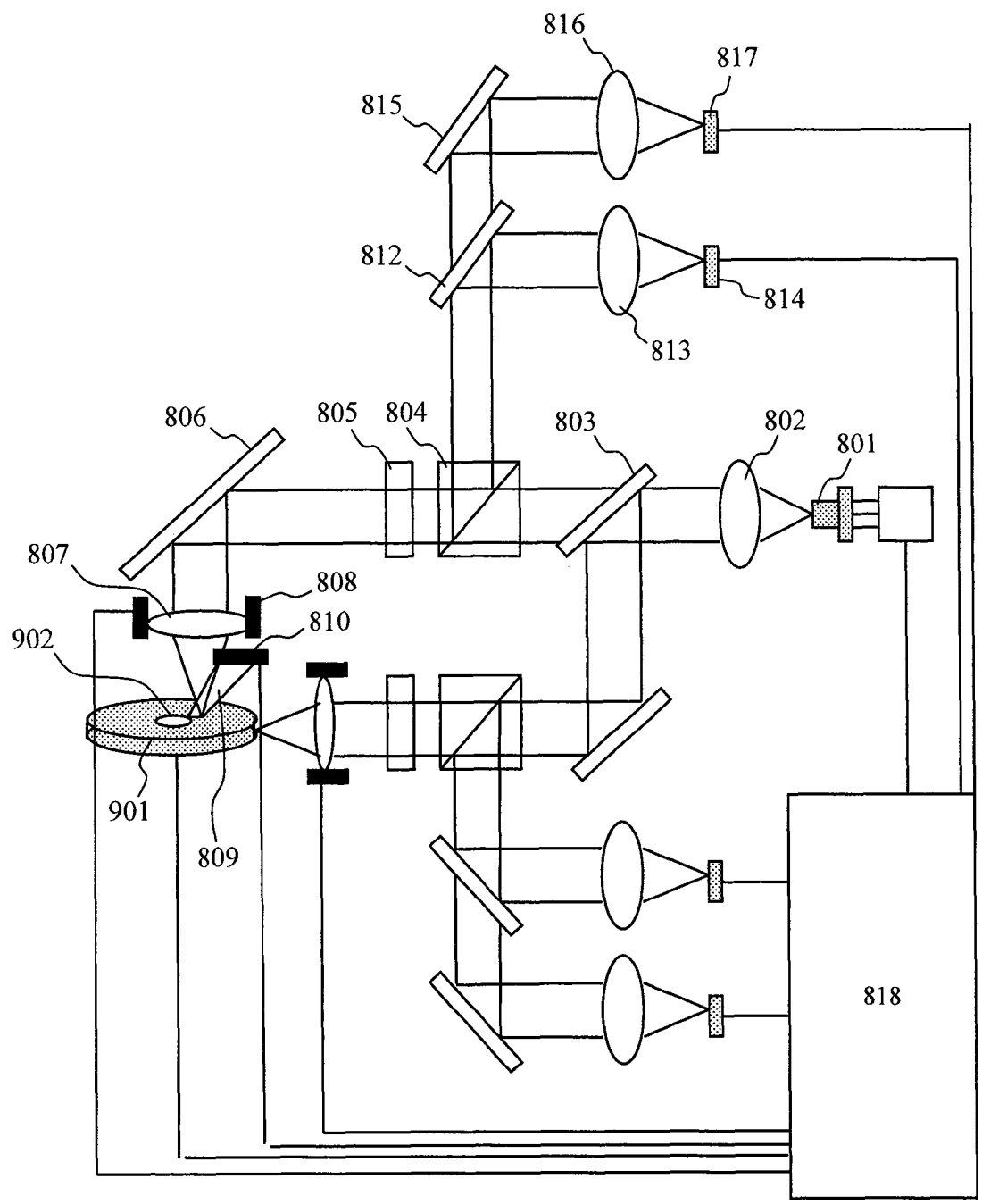
FIG. 9 is a diagram illustrating an exemplar configuration of a recording and reading-out apparatus for a disk to which the present invention is applied.

FIG. 9 illustrates the configuration of an apparatus used in this embodiment. The configuration illustrated in FIG. 9 is almost the same as the one illustrated in FIG. 7, except for the following differences. First, a beam of far-field light is used as the incident light entering from one side. Second, a spindle 902 is provided to rotate a disk 901, and the operation of the spindle 902 is controlled by a control system 818. The size of each of the metal rods extending vertically from the side surface of the disk and the pitch at which the metal rods are arranged are determined so as to allow the detection by use of the far-field light. The controlling of the entry position of the far-field light is executed by a method that is similar to the one described by referring to FIG. 7. That is, to execute the control, the asymmetry of the diffraction light from the gold rod is detected as in the case of ordinary optical disks. In this case, however, with respect to the offset directions between the position of the objective lens and the position of the gold rod on the side surface of the rotating disk, the vertical directions and the focusing direction have to be taken into consideration. For this reason, a 4-division photo detector is used for the detection of the far-field light, and, the signals thus detected are used for controlling the volume to be applied to the actuator to which the objective lens is fitted.

Lubricant oil was applied to the surface of this disk, and a probe like the ones described in FIG. 4 and fitted to the tip end of a gimbal was placed on the lubricant oil. Recording and reading-out of data were executed by irradiating light onto the top surface and the side surfaces of the rotating disk. The same powers of the laser as those in the first embodiment were employed when data were recorded and read out, respectively. The bit-error rate measured in the second embodiment was $1.2 \times 10^{-4}$.

The recording density for each of the layers of this disk with a 100-nm distance between every two adjacent bits was approximately 250 Gb/in$^2$. The disk had one hundred identical layers of this sort, so that an effective recording density of 25 Tb/in$^2$ was accomplished in this second embodiment.

DESCRIPTION OF SYMBOLS 101 metal wires
102 dielectrics
103 recording material
104 incident light
105 incident light
204 incident light
205 incident light
301 substrate
302 metal
303 recording material
304 first molecules
305 second molecules
306 dielectrics
401 gold rod
402 resin
405 objective lens
406 probe
407 objective lens
408 probe
501 probe
502 alumina
601 gimbal
602 head
603 objective lens
701 solid immersion lens
801 semiconductor laser
802 objective lens
803 half minor
804 polarized beam splitter
805 quarter-wave plate
806 minor
807 objective lens
808 actuator
809 gimbal
810 actuator
811 recording medium
812 half minor
813 objective lens
814 photo detector
815 minor
816 objective lens
817 photo detector
818 control system
901 disk
902 spindle

What is claimed is:

1. An information storage apparatus comprising:
an information recording medium having a structure in which a plurality of wire layers are stacked one upon another with a dielectric layer interposed between each adjacent two of the wire layers, each of the wire layers being formed of a plurality of metal wires arranged in a two-dimensional lattice shape in dielectrics except for lattice points, and recording materials each arranged at a corresponding one of the lattice points, the recording materials being provided discretely at the plurality of lattice points that are distributed three-dimensionally;

a first optical system which is positioned so as to face a first surface of the information recording medium and which irradiates light selectively onto an end face of one of the plurality of metal wires exposed on the first surface in a two-dimensional array shape;

a second optical system which is positioned so as to face a second surface of the information recording medium, the second surface including exposed end faces of metal wires arranged in the direction crossing the metal wires exposed on the first surface and arranged within the same wire layer that the metal wires exposed on the first surface belong to, the second optical system irradiating light selectively onto an end face of one of the plurality of metal wires exposed on the second surface in a two-dimensional array shape; and a control unit to control the positions of the first and second optical systems so as to cause interference, at the position of the recording material provided at a corresponding desired one of the lattice points, between a surface plasmon that is excited, by the irradiation of light from the first optical system, on the metal wire with its end face exposed on the first surface of the information recording medium and a surface plasmon that is excited, by the irradiation of light from the second optical system, on the metal wire with its end face exposed on the second surface of the information recording medium.

2. The information storage apparatus according to claim 1, wherein
at least one of the first and second optical systems includes an objective lens and a probe that generates near-field light,
the objective lens concentrates incident light on the probe, and
the near-field light generated by the probe is irradiated onto the end face of the metal wire.

3. The information storage apparatus according to claim 1, wherein
the information recording medium has any one of a cube shape and a cuboid shape.

4. The information storage apparatus according to claim 1, further comprising
a medium driving unit that drives to rotate the information recording medium that has a disk shape, wherein
the first optical system faces any one of a top surface and a bottom surface of the disk-shaped information recording medium, whereas the second optical system faces a side surface of the disk-shaped information recording medium.

5. The information storage apparatus according to claim 4, wherein
the wire layers are arranged perpendicularly to disk surfaces of the disk-shaped information recording medium.

6. The information storage apparatus according to claim 1, further comprising a photo detector to detect scattered light caused by the scattering of the surface plasmons that interfere with each other at the position of the recording material provided at the corresponding desired one of the lattice points.

7. A method of recording information in a medium by using first and second optical systems, the medium having a structure in which a plurality of wire layers are stacked one upon another with a dielectric layer interposed between each adjacent two of the wire layers, each of the wire layers being formed of a plurality of metal wires arranged in a two-dimensional lattice shape in dielectrics except for lattice points, and recording materials each arranged at a corresponding one of the lattice points, the recording materials being provided discretely at the plurality of lattice points that are distributed three-dimensionally, the method comprising:

positioning the first optical system so as to face a first surface of the information recording medium and to irradiate light selectively onto an end face of one of the plurality of metal wires exposed on the first surface in a two-dimensional array shape;

positioning the second optical system so as to face a second surface of the information recording medium, the second surface including exposed end faces of metal wires arranged in the direction crossing the metal wires exposed on the first surface and arranged within the same wire layer that the metal wires exposed on the first surface belong to, the second optical system irradiating light selectively onto an end face of one of the plurality of metal wires exposed on the second surface in a two-dimensional array shape; and controlling the positions of the first and second optical systems so as to cause interference, at the position of the recording material provided at a corresponding desired one of the lattice points, between a surface plasmon that is excited, by the irradiation of light from the first optical system, on the metal wire with its end face exposed on the first surface of the information recording medium and a surface plasmon that is excited, by the irradiation of light from the second optical system, on the metal wire with its end face exposed on the second surface of the information recording medium.

8. The method of claim 7, wherein at least one of the first and second optical systems includes an objective lens and a probe that generates near-field light, and wherein the objective lens concentrates incident light on the probe, the method further comprising:
irradiating the near-field light generated by the probe onto the end face of the metal wire.

9. The method of claim 7, further comprising:
rotating the information recording medium that has a disk shape, wherein the first optical system faces any one of a top surface and a bottom surface of the disk-shaped information recording medium, whereas the second optical system faces a side surface of the disk-shaped information recording medium.

10. The method of claim 7, further comprising:
detecting scattered light caused by the scattering of the surface plasmons that interfere with each other at the position of the recording material provided at the corresponding desired one of the lattice points.

\* \* \* \* \*